Dec. 18, 1951  J. W. GIBONEY  2,579,230
ILLUMINATED LICENSE PLATE FRAME
Filed April 13, 1949
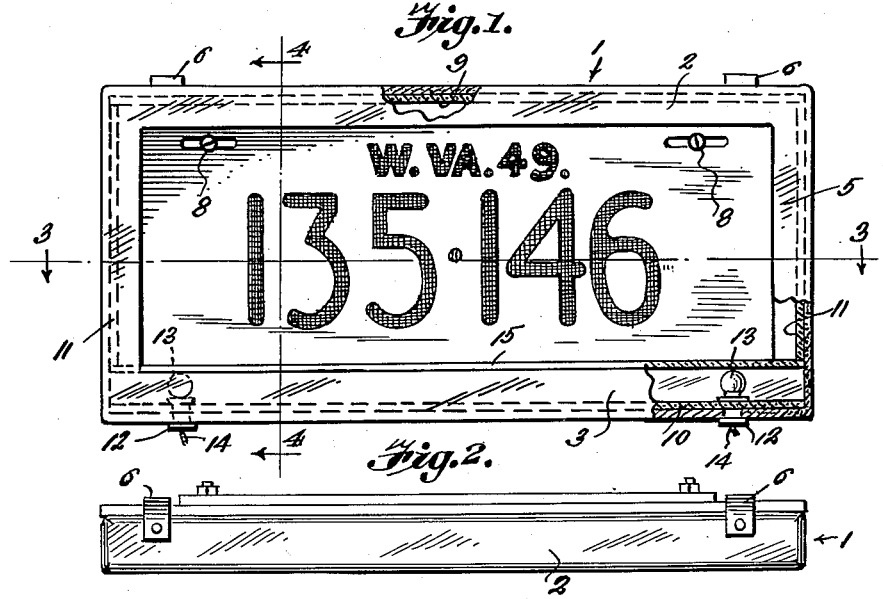
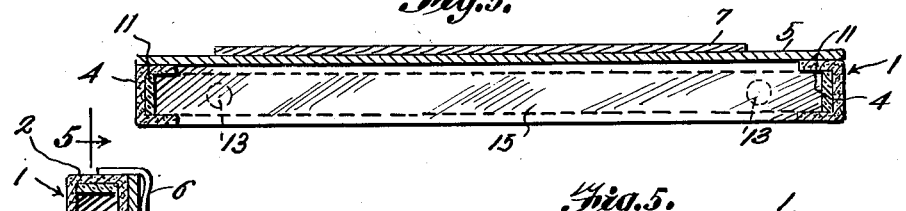
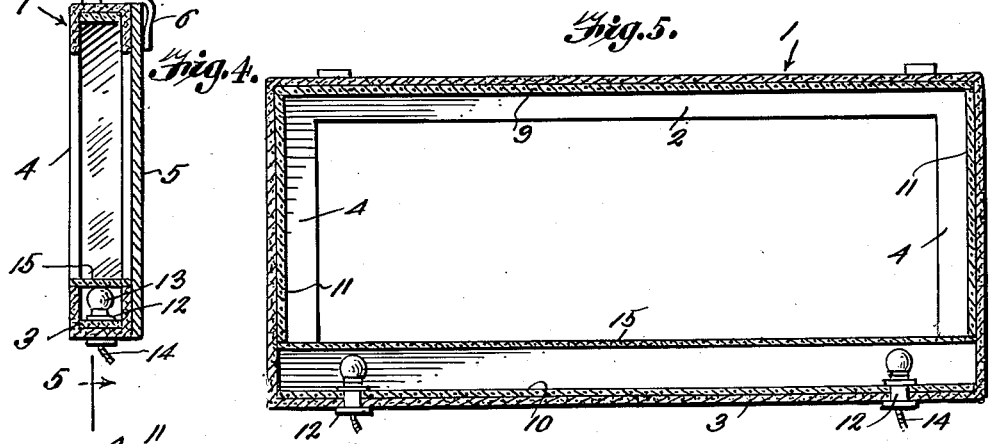
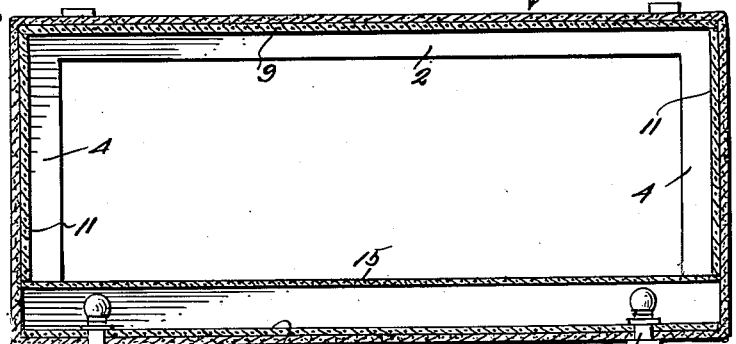
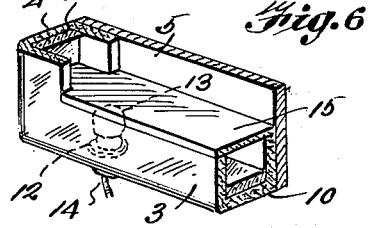
INVENTOR.
JOE W. GIBONEY
BY
ATTY Patented Dec. 18, 1951

2,579,230

UNITED STATES PATENT OFFICE 2,579,230

ILLUMINATED LICENSE PLATE FRAME

Joe W. Giboney, Spencer, W. Va.

Application April 13, 1949, Serial No. 87,291

1 Claim. (Cl. 40—132)

This invention relates to an illuminated license plate frame and it is one object of the invention to provide a frame which is adapted to be mounted against the front face of a license plate and carries electric bulbs by means of which the license plate may be illuminated and thus clearly displayed at night, the device also serving as a rear light for the automobile or other motor vehicle upon which the license plate is mounted.

Another object of the invention is to provide a frame which may be detachably mounted against marginal portions of the license plate and thus form an attractive border for the license plate as well as serving as means for illuminating the license plate.

Another object of the invention is to provide a frame which is formed of channeled material, such as sheet metal or the like, and carries strips of mirror along inner surfaces of its ends and upper and lower sides which reflect light from electric bulbs so that the lighting effect of the bulbs will be increased and the license plate thus illuminated to such an extent that it can be clearly seen.

Another object of the invention is to provide a frame of this character wherein the bulbs are mounted near ends of the lower side bar of the frame, this lower bar being provided with a transparent covering which serves as a shield for the bulbs and prevents dust and dirt from accumulating to the lower bar as well as prevent snow and rain water from filling the bar and interfering with proper functioning of the light bulbs.

Another object of the invention is to provide a frame which is of simplified construction and may be manufactured at low cost.

With these and other objects in view the improved illustrated license plate frame consists of a special construction and arrangement of parts illustrated in the accompanying drawings wherein:

Fig. 1 is a view showing the improved illuminating frame mounted against the outer face of a license plate, portions of the frame being shown in section.

Fig. 2 is a top plan view of the license plate and frame shown in Figure 1.

Fig. 3 is a longitudinal sectional view taken along the line 3—3 of Figure 1.

Fig. 4 is a transverse sectional view taken vertically along the line 4—4 of Figure 1.

Fig. 5 is a longitudinal sectional view taken vertically through the illuminating frame, the license plate being omitted.

Fig. 6 is a perspective view of a lower corner portion of the frame.

This improved illuminating frame 1 may be formed of sheet metal, plastic, or other suitable material, and has upper and lower bars 2 and 3 and end bars 4. These bars are of channeled formation, as shown in Figures 3 and 4, and each is U-shaped in cross section with its side flanges presented inwardly of the frame. The frame is of such dimensions that it conforms to the length and height of the license plate 5 to which it is applied and in order to firmly but detachably hold the frame against the outer face of the license plate there have been provided resilient clips 6 which are carried by the upper bar 2 and have rear portions formed with downwardly extending bills for overlapping the rear surface of the license plate and tightly gripping the same. The license plate is mounted against its supporting bracket 7 by the usual bolts 8 and when the open frame is applied to the license plate the entire license plate will be exposed through the frame except its marginal portions which are covered by upper and lower bars and the end bars of the frame. By having the frame colored red the license plate will be prominently displayed and readily located by a person looking at the automobile or other motor vehicle upon which the license plate and its frame are mounted. The frame reinforces the license plate along its margins and reduces likelihood of the license plate being bent or torn.

Strips of mirror 9 and 10 are mounted in the upper and lower bars and similar strips of mirror 11 are mounted in the end bars. These mirrors are of such length and width that they fit snugly in the bars where they are secured by cement, or in any other desired manner, and through the lower bar and its mirror are mounted sockets 12 into which light bulbs 13 are screwed. The sockets are located near opposite ends of the lower bar 3 and the bulbs are thus disposed close to the ends of the frame so that when a conventional switch controlling the flow of current through the wires 14 is turned on and the bulbs lighted, light from the bulbs will be reflected from the bottom mirror 10, the end mirrors 11, and the top mirror 9. Therefore light will be directed across the license plate from all directions and the license plate very well illuminated and clearly displayed. Since the frame is formed of channeled bars, dirt, snow, and rain water would be liable to accumulate in the lower bar 3 and render its mirror inoperative as well as being liable to cover the bulbs or form a short circuit by water entering the sockets into which the bulbs are screwed. In order to prevent this a transparent strip 15 which may be formed of plastic, or any other suitable material, is mounted along the lower bar and suitably held in place so that it may be detached when it is necessary to replace burned out bulbs with new ones. It will thus be seen that passage of light upwardly in the frame from the bulbs will not be interfered with but damage to the bulbs and coating of the lower mirror will be prevented.

While there has been illustrated and described a preferred embodiment of the invention it is to be understood that the invention is not restricted to the specific construction shown such as come within the scope of the claim.

Having thus described the invention, what is claimed is:

A license plate illuminating device comprising a frame open at its front and back and having upper and lower bars and end bars, said bars being of channeled formation and having outer walls and side walls and open inner sides presented inwardly of the frame, resilient clips carried by the upper bar and having bills projecting downwardly back of its rear side wall in position for overlapping engagement with an upper marginal portion of a license plate to removably support the frame in close fitting engagement with marginal portions of the front face of the said license plate and display the license plate through the open frame, strips of mirror mounted snugly within the bars against inner surfaces of the outer walls thereof, sockets mounted through the outer wall of the lower bar and the mirror therein, light bulbs mounted in said sockets, and a strip of transparent material removably mounted along the upper edges of the side walls of the lower bar, with its ends fitting snugly into lower ends of the end bars, said strip constituting a transparent inner wall for the lower bar disposed in shielding relation to the sockets and the bulbs.

JOE W. GIBONEY.

REFERENCES CITED

The following references are of record in the file of this patent:

UNITED STATES PATENTS

| Number | Name | Date |
|---|---|---|
| 1,411,920 | Kramer | Apr. 4, 1922 |
| 2,104,230 | Kiss | Jan. 2, 1938 |
| 2,309,805 | Tiffany | Feb. 2, 1943 |